(12) United States Patent
Yamashita

(10) Patent No.: US 7,637,668 B2
(45) Date of Patent: Dec. 29, 2009

(54) TAPER BORE BEARING ASSEMBLY

(75) Inventor: Toru Yamashita, Kildeer, IL (US)

(73) Assignee: FYH Bearing Units USA, Inc., Wauconba, IL (US)

(*) Notice: Subject to any disclaimer, the term of this patent is extended or adjusted under 35 U.S.C. 154(b) by 437 days.

(21) Appl. No.: 11/545,785

(22) Filed: Oct. 10, 2006

(65) Prior Publication Data

US 2008/0085072 A1 Apr. 10, 2008

(51) Int. Cl.
*F16C 35/073* (2006.01)
(52) U.S. Cl. .................. 384/538; 384/540; 384/541
(58) Field of Classification Search ............ 384/537, 384/538, 540, 541, 584, 585; 403/369–371
See application file for complete search history.

(56) References Cited

U.S. PATENT DOCUMENTS

| | | | | | |
|---|---|---|---|---|---|
| 1,749,281 | A | * | 3/1930 | Hambleton | 384/540 |
| 2,102,375 | A | * | 12/1937 | Morton | 384/585 |
| 3,771,845 | A | * | 11/1973 | Stricklen | 384/540 |
| 4,046,433 | A | * | 9/1977 | Kiener | 384/540 |
| 5,011,306 | A | * | 4/1991 | Martinie | 384/585 |
| 5,709,483 | A | * | 1/1998 | Martinie | 384/538 |
| 5,876,127 | A | * | 3/1999 | Casey | 384/538 |
| 6,425,690 | B1 | * | 7/2002 | DeWachter | 384/583 |
| 7,305,767 | B2 | * | 12/2007 | Nisley et al. | 403/314 |

* cited by examiner

*Primary Examiner*—Thomas R Hannon
(74) *Attorney, Agent, or Firm*—Michael P. Fortkort

(57) ABSTRACT

A taper bore bearing assembly permits variability in diameter of the rotating shaft. An annular cylinder is mechanically coupled to the rotatable shaft and a bearing element is in turn mechanically coupled to the annular cylinder, which includes a tapered bore so that an interior diameter of the annular cylinder decreases from one end to the other. An inner race of the bearing element includes accepts the annular cylinder. The interior diameter of the inner race decreases from one end to the other. A locking ring locks the annular cylinder to the bearing element. Holes extend radially through the locking ring. A screw thread mechanically couples with the bearing assembly, which screw thread is inscribed on an interior surface of the locking ring. Cutout sections in the screw thread are formed by the holes. Setscrews disposed in the holes hold the locking ring in place. The setscrews include a foot to mechanically couple with the bearing assembly, which foot includes a portion of a screw thread that matches one of the cutout sections or holes of the screw thread.

20 Claims, 5 Drawing Sheets

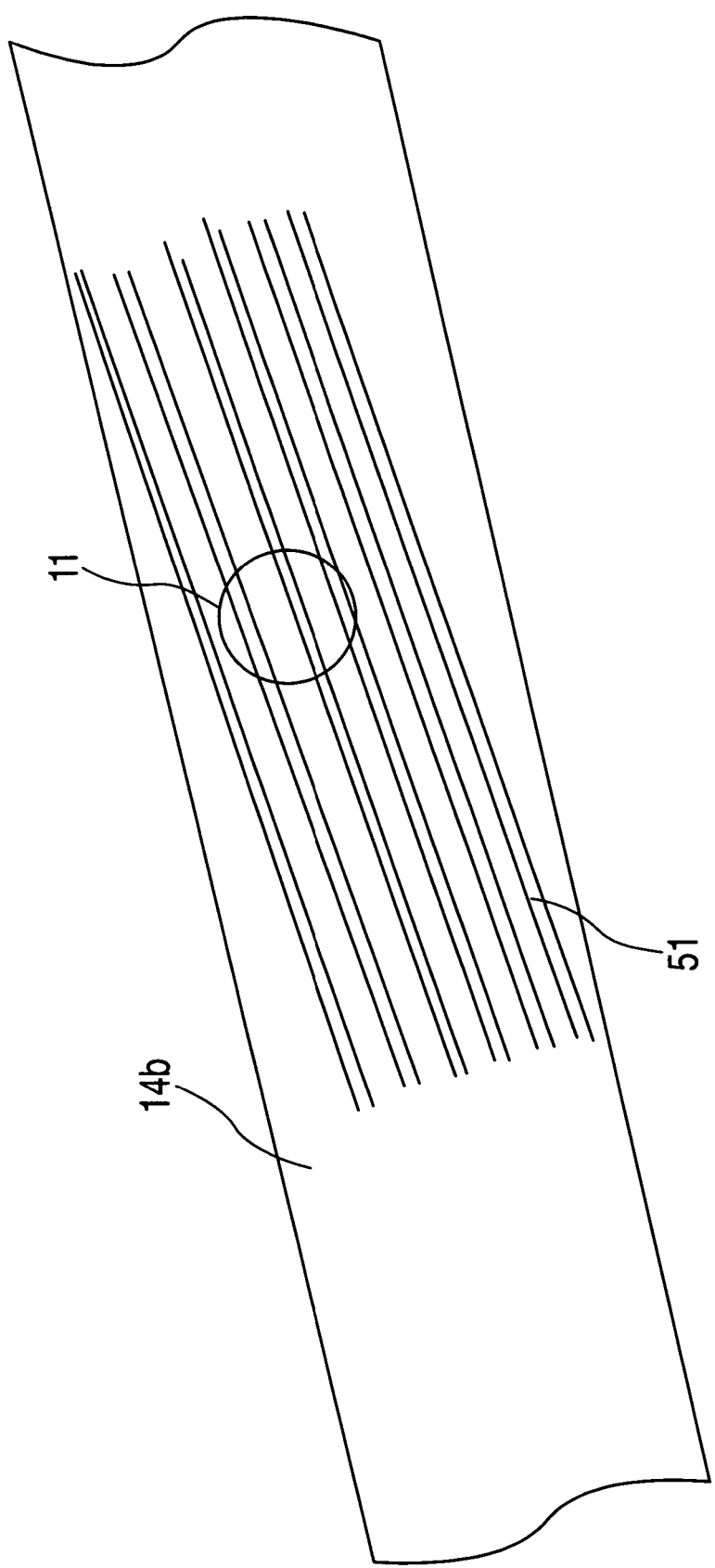

TAPER BORE BEARING ASSEMBLY

FIELD OF THE INVENTION

The present invention relates generally to bearing assemblies and, in particular, to a bearing assembly for mechanically coupling to a rotary shaft or axle.

BACKGROUND

Rotary shafts are generally mounted such that their ends are rotatably mounted in respective rotary bearings, such as ball bearings, roller bearings, etc. For example, a bearing is mounted in an opening of a bearing housing of a conventional pillow block. A shaft end would project through the bearing.

Two problems exist with this configuration. First, the rotary shaft must be properly dimensioned to mechanically couple with the opening. However, the existing design does not permit deviations from set tolerances, as such deviations would prevent proper mechanical coupling.

Moreover, the rotating shaft is preferably easily removed to permit maintenance on the apparatus. However, the present configuration requires a tight mechanical fit, which can make removal difficult, especially after significant hours of operation in a potentially dirty or non-clean environment. In certain applications, such as go-carts, a mechanic would prefer to clean the bearing assembly after use; however, in the existing configuration this is not possible without damaging the bearing assembly.

The present invention is therefore directed to the problem of developing a bearing assembly that permits a wide range of rotating shafts to be mechanically coupled to the bearing while simultaneously permitting ease of assembly and removal.

SUMMARY OF THE INVENTION

The present invention solves these and other problems by providing a taper bore bearing assembly that permits a wide range of variation in size of the rotating shaft in combination with a locking ring that permits easy removal and/or cleaning of the bearing.

According to one aspect of the present invention, an exemplary embodiment of a bearing assembly for mechanically coupling to a rotatable shaft includes an annular cylinder to mechanically couple to the rotatable shaft and a bearing element mechanically coupled to the annular cylinder. The annular cylinder includes a tapered bore defining an interior surface of the annular cylinder so that an interior diameter of the annular cylinder decreases from one end to the other. The bearing element includes an inner race to accept the annular cylinder. The bearing element also includes a tapered bore defining an interior surface of the inner race so that an interior diameter of the inner race decreases from one end to the other. The assembly includes a locking ring mechanically coupled with the annular cylinder to lock the annular cylinder to the bearing element.

According to yet another aspect of the present invention, the annular cylinder in the exemplary embodiments herein may include an axial cutout disposed in parallel with a length of the rotatable shaft.

According to still another aspect of the present invention, the bearing assembly of the exemplary embodiments herein may include a screw thread disposed on an exterior surface of at least a portion of one end of the annular cylinder and extending in length multiple helical revolutions around the annular cylinder.

According to yet another aspect of the present invention, the bearing element of the exemplary embodiments herein may include one or bearings.

According to still another aspect of the present invention, in the exemplary embodiments herein that include a locking ring, the locking ring may include a screw thread to mechanically couple with a screw thread of the annular cylinder, which the screw thread of the locking ring is inscribed on the interior surface of the locking ring.

According to yet another aspect of the present invention, in the exemplary embodiments herein that include a locking ring, the locking ring may include one or more holes extending radially from an exterior surface of the locking ring to an interior surface of the locking ring, in which case a screw thread inscribed on the interior surface of the locking ring includes one or more holes or cutout sections formed by the one or more holes.

According to still another aspect of the present invention, in the exemplary embodiments herein that include a locking ring, the locking ring may include one or more set screws, one disposed in each of the one or more holes. In these exemplary embodiments, each of the one or more setscrews may include a head that is mechanically couplable with a set tool. Moreover, in these exemplary embodiments, each of the one or more setscrews may include a foot to mechanically couple with a screw thread of the annular cylinder.

According to yet another aspect of the present invention, in the exemplary embodiments herein that include one or more set screws, a foot of each of the one or more set screws may include a portion of a screw thread disposed thereon that matches one of the cutout sections or holes of the screw thread inscribed on the interior surface of the locking ring. In this case, when each of the portions of the screw thread of each of the one or more set screws is combined with the screw thread with the one or more cutout sections inscribed on the interior surface of the locking ring a substantially complete screw thread is formed on the interior surface of the locking ring.

According to still another aspect of the present invention, the locking ring includes a first interior surface having a first interior diameter, a second interior surface having a second interior diameter, and a second screw thread inscribed on the first interior surface to mechanically couple with the first screw thread of the annular cylinder.

According to yet another aspect of the present invention, the exterior surface of the annular cylinder has a diameter that matches the first interior diameter of the first interior surface of the locking ring and the second interior diameter of the second interior surface of the locking ring is larger than the diameter of the first interior surface.

According to still another aspect of the present invention, the locking ring includes a flat surface facing the bearing element having a width larger than an opening of the bearing element to form a seal against the bearing element opening when screwed in place against the bearing element.

According to yet another aspect of the present invention, an exemplary embodiment of a bearing assembling includes an annular cylinder for mechanically coupling a rotatable shaft to a bearing assembly includes a tapered bore defining an interior surface of the annular cylinder, a diameter of which decreases from the one end to the other. The bearing assembling also includes a bearing element mechanically coupled to the annular cylinder and a locking ring mechanically coupled with the annular cylinder to lock the annular cylinder to the bearing element.

According to still another aspect of the present invention, in the exemplary embodiment of the bearing assembling the annular cylinder may include an axial cutout disposed in parallel with a length of the rotatable shaft.

According to yet another aspect of the present invention, in the exemplary embodiment of the bearing assembling the annular cylinder may include a screw thread disposed on an exterior surface of at least a portion of one end of the annular cylinder and extending in length multiple helical revolutions around the annular cylinder.

According to still another aspect of the present invention, an exemplary embodiment of a bearing element includes an inner race to mechanically couple to a rotatable shaft. The inner race includes a tapered bore defining an interior surface of the inner race so that a diameter of the interior surface of the inner race decreases from one end to the other. The bearing element includes a locking ring to lock the bearing assembly to the rotatable shaft and to act as a seal for the open side of the bearing element.

According to yet another aspect of the present invention, a locking ring for use in a bearing assembly includes one or more holes extending radially through the locking ring from an exterior surface of the locking ring to an interior surface of the locking ring, a screw thread to mechanically couple with the bearing assembly, which screw thread is inscribed on an interior surface of the locking ring and one or more cutout sections formed by the one or more holes. The exemplary embodiment of the locking ring includes one or more set screws, each disposed in one of the one or more holes. Each of the one or more setscrews includes a foot to mechanically couple with the bearing assembly. The foot of the setscrew includes a portion of a screw thread disposed thereon that matches one of the cutout sections or holes of the screw thread. In this exemplary embodiment of the locking ring, when each of the portions of the screw thread on each foot of each of the one or more set screws is combined with the screw thread with the one or more cutout sections inscribed on the interior surface of the locking ring a substantially complete screw thread is formed on the interior surface of the locking ring.

BRIEF DESCRIPTION OF THE DRAWINGS

FIG. 5 depicts a top view of an exemplary embodiment of the inner surface of a locking ring for use in the above bearing assembly according to still another aspect of the present invention.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
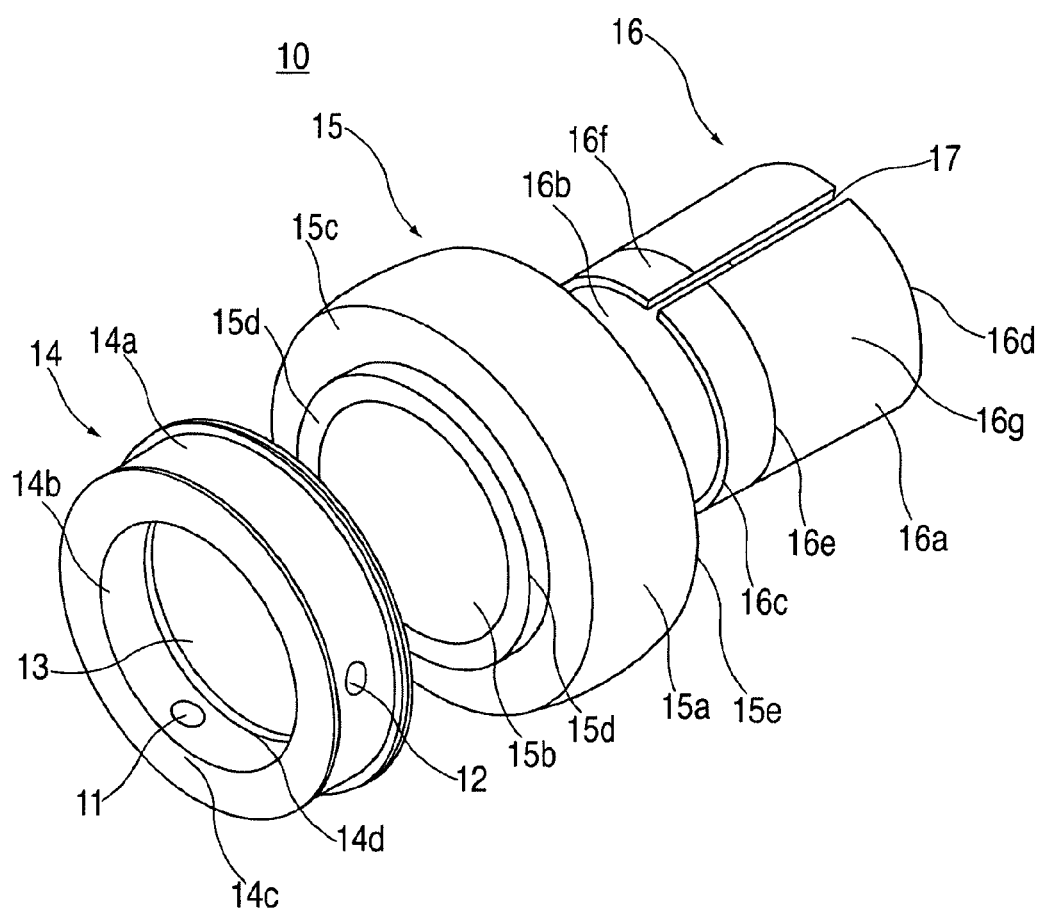
FIG. 1 depicts an exemplary embodiment of a tapered bore bearing assembly according to one aspect of the present invention in an exploded perspective view.

Referring to FIG. 1, shown therein is an exemplary embodiment 10 of the taper bore bearing assembly 10 of the present invention, which includes essentially three main components: an annular cylinder or ring 16, a rolling element bearing 15 and a locking ring 14. The taper bore bearing assembly 10 is designed to accept or be mechanically coupled to a rotatable shaft (not shown). Thus, the rotatable shaft rotates about a central axis of the taper bore bearing assembly 10. The rotatable shaft would be disposed in the hole 13 of the taper bore bearing assembly 10.

Annular Cylinder

For ease of explanation, the annular cylinder or ring 16 will be defined to have a first end 16c and a second end 16d. The annular cylinder 16 also has an exterior surface 16a (i.e., the outside of the cylinder) and an interior surface 16b (i.e., the inside of the cylinder). The interior surface 16b of the annular cylinder 16 is designed to be in mechanical contact with the rotatable shaft (not shown). As such, the inside wall is essentially smooth.

The exterior surface 16a of the annular cylinder 16 includes two sections 16f, 16g. Line 16e in FIG. 1 demarks the two sections 16f, 16g. A first section 16f disposed on the first end 16c has a first diameter. A first thread (not shown, e.g., male thread) is disposed in the first section 16f. While a male thread is described herein as an example, a female thread could be employed, in which case the opposite threading would be used on the mating piece (e.g., the locking ring 14) as will be described below. Moreover, the direction of threading is not important to the present invention; hence any direction can be employed without departing from the scope of the present invention.

A second section 16g is disposed on the second end 16d of the annular cylinder 16. The second section 16g has a smooth exterior surface that is tapered so that a diameter of the exterior of the annular cylinder 16 in the second section 16g begins at a maximum at the second end 16d and reaches its minimum in the second section 16g at line 16e.

The diameter of the exterior in the first section 16f: may remain constant at or about the minimum exterior diameter of the second section 16g; may be tapered from the minimum exterior diameter of the second section 16g to another smaller value; or may employ an abrupt change in diameter from the minimum exterior diameter in the second section 16g to a somewhat smaller value that then remains constant or tapers to yet a smaller value. In all cases, the diameter of the exterior of the first section 16f has its smallest value at the first end 16c.

The tapered exterior surface 16a of the annular cylinder 16 is designed to mechanically couple with the interior surface of the inner race 15b of the rolling element bearing 15. The interior surface of the inner race 15b is also tapered in diameter, as will be discussed below. The second section 16g of the exterior surface 16a of the annular cylinder 16 is the portion of the annular cylinder 16 that is mechanically coupled to the inner race 15b of the rolling element bearing 15. As such, the surfaces are designed to be essentially of similar tapered construction. Moreover, the maximum value of the exterior surface 16a of the annular cylinder 16 is designed so that the second end 16d of the annular cylinder 16 will be essentially flush with the end 15e of the inner race 15b of the rolling element bearing 15 that faces the first end 16c in FIG. 1. This is accomplished by selecting the exterior diameter of the second section 16g at the second end 16d to be slightly larger than the maximum interior diameter of the inner race 15b at the end of the inner race 15e that faces the first end 16c in FIG. 1. By selecting the exterior diameter of the second section in this manner, the tapering acts as a stop to prevent the annular cylinder 16 from passing through the rolling element bearing 15 and inner race 15b. Most or all of the second section 16f of the annular cylinder 16 extends through the inner race 15b so that the screw thread on the exterior of the second section 16f can mate with the screw thread on the interior surface of the locking ring 14.

The interior surface 16b of the annular cylinder 16 is designed to mechanically couple with the rotatable shaft (not shown). The interior surface 16b is also tapered in diameter so that varying diameters of rotatable shafts can be accepted by the taper bore bearing assembly 10. The diameter of the interior surface 16b reaches it maximum at the second end 16d of the annular cylinder 16 and its minimum at the first end 16c of the annular cylinder 16 and gradually varies between these two extremes in a tapered manner.

To accommodate the varying sizes of the rotatable shafts, the annular cylinder 16 employs an axial cutout 17 that runs the length of the annular cylinder 16. The axial cutout 17 enables the annular cylinder 16 to be slightly circumferentially (and thereby radially) compressed to form a stronger mechanical contact with rotatable shafts of varying diameters.

Rolling Element Bearing

The rolling bearing assembly 15 used in the exemplary embodiment includes an inner race 15b, an outer race 15a, a cage 15c and a plurality of balls inside the cage 15c (not shown). While a caged ball bearing assembly is used for discussion purposes herein, any rolling element bearing or radial rolling element bearing could be employed without departing from the present invention.

The inner race 15b employs a tapered inner diameter that begins at its maximum at the end 15e (see FIG. 2) that faces the first end 16c of the annular cylinder in FIG. 1. End 15e is opposite end 15d of inner race 15b. As was discussed above, the interior diameter of the inner race 15b is slightly smaller at the end 15e of the inner race 15 that faces the second end of the annular cylinder 16 than the maximum diameter of the exterior of the second section 16g at the second end 16d.

By selecting the relative diameters in this manner, the tapering acts as a stop to prevent the annular cylinder 16 from passing through the rolling element bearing 15 and inner race 15b.

Locking Ring

Locking ring 14 serves to lock the annular cylinder 16 in place in the inner race 15b of the rolling element bearing 15. To do so, the locking ring 14 employs a screw thread (see FIG. 5) that mates with the screw thread (not shown) disposed in the first section 16f of the exterior 16a of the annular cylinder 16.

The locking ring 14 also serves as an end cap on the bearing element. This enables rapid removal of the end cap so that one can easily clean the bearing element without destroying the bearing element, as would be the case in a bearing element with a fixed end cap. This aspect of the bearing assembly of the present invention enables easy cleaning and re-lubrication of the bearing. The standard bearing has a seal and a slinger that is completely fixed to the outer ring or inner ring, therefore without breaking these apart, one cannot clean the inside of the bearing. In a racing implementation, a mechanic may wish to clean up the bearing after a first race, but, cannot in the standard and regular bearing, however, this is now possible with the bearing assembly of the present invention by simply un-screwing of the nut to open one side, and clean up and re-lubricate. This is applicable in a go-cart bearing assembly.

Additionally, the locking ring is slightly tapered in the same direction as the tapering in the annular cylinder 16 and the inner race 15b, i.e., the diameter of the interior 14b of the end 14d of the locking ring 14 is largest and then tapers to the point where the diameter of the interior 14b at the end 14c of the locking ring 14 is smallest.

Once screwed in place, the locking ring 14 slightly compresses the circumference of the annular cylinder 16 due to the cutout section 17 and the tapering of the interior surface 14b of the locking ring 14.

To maintain the locking ring 14 in place over time, the locking ring 14 employs one or more set screws 11, 12. For example, one exemplary embodiment could employ three setscrews 11, 12 disposed in a radially symmetric pattern about the center of the locking ring 14. However, any number of setscrews from one to many could be employed without departing from the scope of the present invention. In FIG. 1, two 11, 12 of the three setscrews are visible. By tightening the set screws 11, 12 using a set tool, such as a screwdriver or the like, one end (termed "the foot") of the set screws 11, 12 becomes mechanically coupled to the first section 16f of the exterior surface 16a of the annular cylinder 16. The other end of the set screw 11, 12 that couples to a set tool is termed "the head."

Referring to FIG. 5, one exemplary embodiment of the mechanical coupling between the setscrews 11, 12 and the exterior surface 16a of the annular cylinder 16 employs a screw thread pattern on the foot of the setscrew 11, 12. The foot of each set screw 11, 12 employs a portion of the screw thread 51 on the interior surface 14b of the locking ring 14 that is removed as a result of a hole in which the set screw is disposed. Once the setscrews 11, 12 are in place the screw thread on the interior surface 14b of the locking ring 14 becomes essentially complete. When tightened, the grooves of the thread portion on the feet of the set screws 11, 12 become mechanically coupled or engaged with the ridges of the thread on the exterior 16a of the annular cylinder 16 and the grooves of the thread on the exterior 16a of the annular cylinder 16 become mechanically coupled or engaged with the ridges of the portion of the thread on the feet of the set screws 11, 12, thereby locking the locking ring 14 in place on the annular cylinder 16. As can be seen in FIG. 5, the screw thread 51 runs across the foot of set screw 11 several times. While the thread 51 in FIG. 5 appears to be multiple threads, in actuality this thread 51 is a single helically inscribed pattern, which in the view of FIG. 5 appears a separate threads.

In one implementation of the set screws, at least the feet of the set screws 11, 12 are made of a different material, such as copper, than the rest of the locking ring, which can be made of steel, or aluminum or the like. The opposite side of the copper foot is threaded and a set screw is disposed inside to push against the top of the copper foot.

Figure 2:
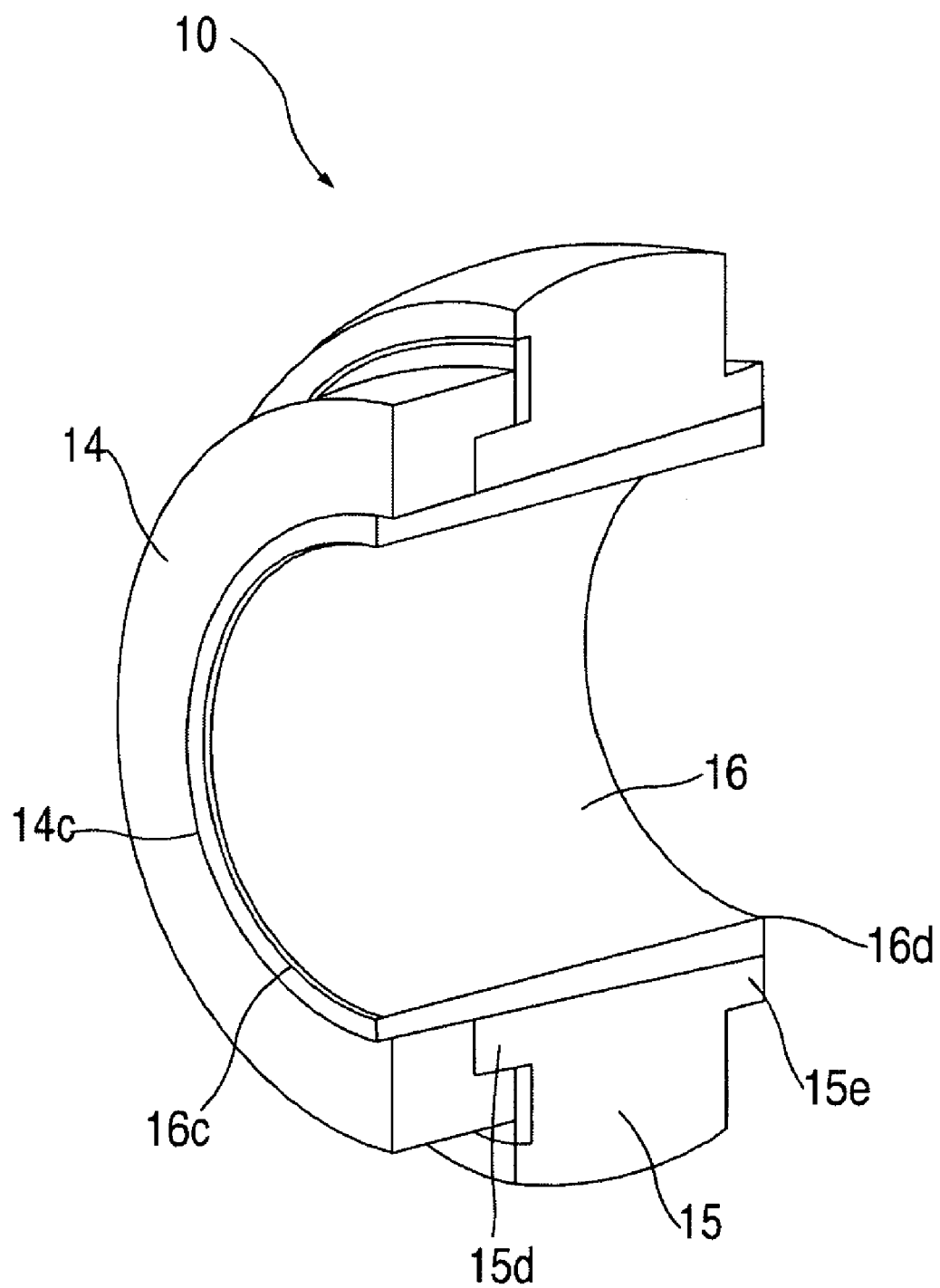
FIG. 2 depicts a section of the exemplary embodiment of FIG. 1 when assembled according to another aspect of the present invention.

Turning to FIG. 2, shown therein is a section of the exemplary embodiment 10 when assembled. The annular cylinder 16 is in contact or mechanically coupled with the rotatable shaft (not shown). The end 16c of the annular cylinder 16 is flush with the end 14c of the locking ring 14. The end 16d of the annular cylinder 16 is flush with the end 15e of the rolling bearing element 15, which houses the bearing.

Figure 3:
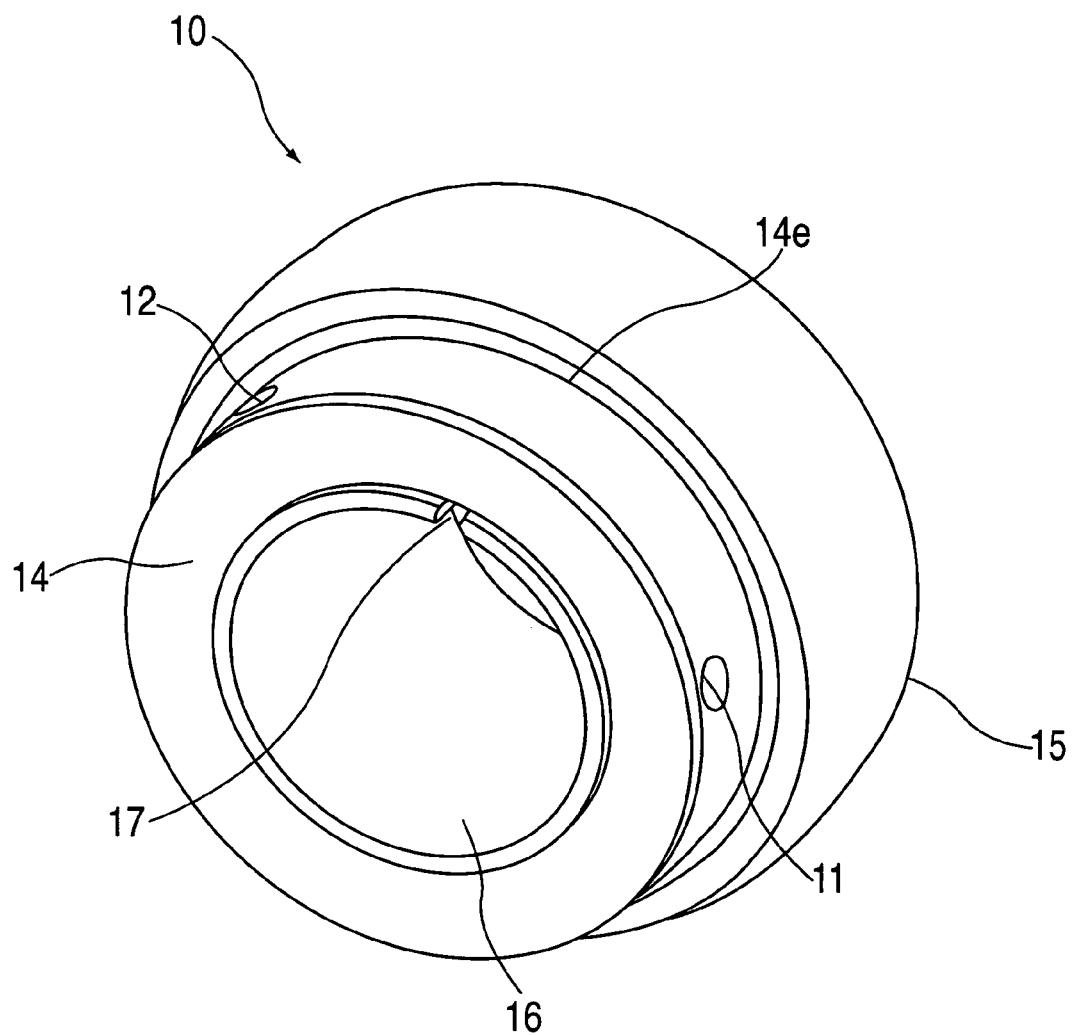
FIG. 3 depicts a perspective view of the exemplary embodiment of FIG. 1 when assembled according to still another aspect of the present invention.

Turning to FIG. 3, shown therein is a perspective view of the exemplary embodiment 10 of the bearing element assembly when assembled. A lip 14e on the locking 14 helps form a seal when the locking ring is locked in place against the bearing element, as will be seen in FIG. 4.

Figure 4:
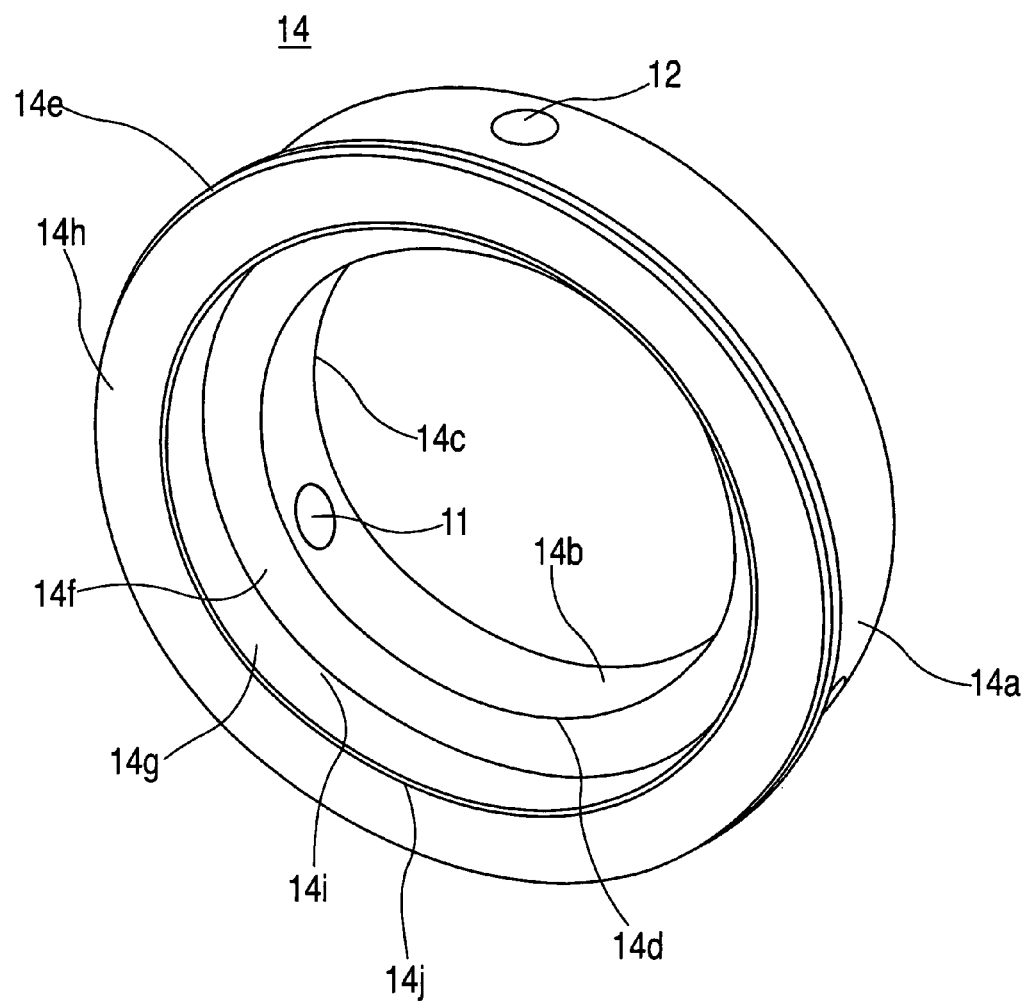
FIG. 4 depicts an exemplary embodiment of a locking ring for use in the exemplary embodiment of FIG. 1 according to yet another aspect of the present invention.

Turning to FIG. 4, shown therein is an exemplary embodiment 14 of a locking ring of the present invention. As mentioned above, holes extend through the locking ring 14, in which holes set screws 11, 12 are mounted. On the inner surface of the locking ring 14 a screw thread is inscribed. The foot of each set screw 11, 12 includes a portion of the entire screw thread inscribed on the interior surface 14*b* of the locking ring 14. Flat surface 14*h* of the locking ring is flush against the rolling bearing element 15, and forms a seal of the bearing. Lip 14*e* ensures a sufficient seal. A diameter of the inner surface 14*g* of the locking ring is larger than the diameter of the interior surface 14*b*, on which is inscribed the screw thread. A step increase in diameter of interior surface 14*b* to interior surface 14*g* creates flat surface 14*f*. The diameter of the inner surface 14*g* is not necessarily tapered from end 14*j* to end 14*i*.

Although various embodiments are specifically illustrated and described herein, it will be appreciated that modifications and variations of the invention are covered by the above teachings and are within the purview of the appended claims without departing from the spirit and intended scope of the invention. For example, a certain type of rolling element bearing is shown in the drawings and discussed herein, however, other types of rolling element bearings are possible without departing from the scope f of the present invention. Moreover, some embodiments may not employ the set screws shown above, while others may. Furthermore, these examples should not be interpreted to limit the modifications and variations of the invention covered by the claims but are merely illustrative of possible variations.

What is claimed is:

1. A bearing assembly for mechanically coupling to a rotatable shaft comprising:
    an annular cylinder to mechanically couple to the rotatable shaft including:
        an interior surface;
        an exterior surface;
        a first end having a first diameter;
        a second end having a second diameter, wherein the second diameter is larger than the first diameter; and
        a first tapered bore defining the interior surface of the annular cylinder and including a first diameter that decreases from the first end to the second end;
    a bearing element mechanically coupled to the annular cylinder including:
        an inner race to accept the first annular cylinder including:
            a first end;
            a second end;
            an interior surface; and
            a second tapered bore defining the interior surface of the inner race and including a second diameter that decreases from the first end of the inner race to the second end of the inner race; and
    a locking ring mechanically coupled with said annular cylinder to lock the annular cylinder to the bearing element.

2. The bearing assembly according to claim 1, further comprising:
    an axial cutout disposed in the annular cylinder and in parallel with a length of the rotatable shaft.

3. The bearing assembly according to claim 1, wherein the bearing element includes one or more bearings.

4. The bearing assembly according to claim 1, wherein said annular cylinder further comprises:
    an exterior surface; and
    a first screw thread disposed on the exterior surface of at least a portion of the second end of the annular cylinder and extending in length a plurality of helical revolutions around the annular cylinder.

5. The bearing assembly according to claim 4, wherein the locking ring further comprises:
    an interior surface; and
    a second screw thread to mechanically couple with the first screw thread of the annular cylinder, said second screw thread inscribed on the interior surface of the locking ring.

6. The bearing assembly according to claim 5, wherein the locking ring further comprises:
    one or more holes disposed in the locking ring, each of said one or more holes extending radially through the locking ring from the exterior surface of the locking ring to the interior surface of the locking ring, wherein said screw thread includes one or more cutout sections formed by the one or more holes.

7. The bearing assembly according to claim 6, wherein the locking ring further comprises:
    one or more set screws, one disposed in each of the one or more holes, each of said one or more set screws including a head that is mechanically couplable with a set tool and a foot to mechanically couple with the first screw thread of the annular cylinder.

8. The bearing assembly according to claim 7, wherein a foot of each of said one or more set screws further comprises:
    a portion of a second screw thread disposed thereon that matches one of the cutout sections of the second screw thread, whereby when each of the portions of the second screw thread of each of the one or more set screws is combined with the second screw thread with the one or more cutout sections inscribed on the interior surface of the locking ring a substantially complete second screw thread is formed on the interior surface of the locking ring.

9. The bearing assembly according to claim 4, wherein the locking ring further comprises:
    a first interior surface having a first interior diameter;
    a second interior surface having a second interior diameter; and
    a second screw thread inscribed on the first interior surface to mechanically couple with the first screw thread of the annular cylinder.

10. The bearing assembly according to claim 9, wherein the exterior surface of the annular cylinder has a diameter that matches the first interior diameter of the first interior surface of the locking ring and the second interior diameter of the second interior surface of the locking ring is larger than the diameter of the first interior surface.

11. The bearing assembly according to claim 10, wherein the locking ring further comprises:
    a flat surface facing the bearing element having a width larger than an opening of the bearing element to form a seal against the bearing element opening when screwed in place against the bearing element.

12. A bearing assembly for mechanically coupling to a rotatable shaft comprising:
    an annular cylinder for mechanically coupling to a rotatable shaft, said annular cylinder including:
        an interior surface;
        an exterior surface;
        a first end having a first diameter;
        a second end having a second diameter, wherein the second diameter of the annular cylinder is larger than the first end of the annular cylinder;
        a tapered bore defining the interior surface of the annular cylinder and including a tapered bore diameter that decreases from the first end to the second end;
    a bearing element mechanically coupled to the annular cylinder; and a locking ring mechanically coupled with said annular cylinder to lock the annular cylinder to the bearing element.

13. The bearing assembly according to claim 12, wherein the annular cylinder further comprises:
an axial cutout disposed in parallel with a length of the rotatable shaft.

14. The bearing assembly according to claim 12, wherein the annular cylinder further comprises:
an exterior surface; and
a first screw thread disposed on the exterior surface of at least a portion of the second end of the first annular cylinder and extending in length a plurality of helical revolutions around the annular cylinder.

15. An apparatus comprising:
an annular cylinder to mechanically couple to a rotatable shaft including:
an interior surface;
an exterior surface;
a first end having a first diameter;
a second end having a second diameter, wherein the second diameter is larger than the first diameter; and
a first tapered bore defining the interior surface of the annular cylinder and including a first diameter that decreases from the first end to the second end;
a bearing element including:
a bearing having an open side and a sealed side;
an inner race to mechanically couple to the annular cylinder, which is turn is coupled to the rotatable shaft, said inner race including:
a first end;
a second end;
an interior surface; and
a tapered bore defining the interior surface of the inner race and including
a tapered diameter that decreases from the first end to the second end; and
a locking ring to lock the bearing assembly to the rotatable shaft and to act as a seal for the open side of the bearing element.

16. The Apparatus according to claim 15, further comprising:
a locking ring for use in a bearing assembly comprising:
an interior surface;
an exterior surface;
one or more holes disposed in the locking ring, each of said one or more holes extending radially through the locking ring from the exterior surface of the locking ring to the interior surface of the locking ring;
a screw thread to mechanically couple with the bearing assembly, said screw thread inscribed on the interior surface of the locking ring and having one or more cutout sections formed by the one or more holes; and
one or more setscrews, one disposed in each of the one or more holes.

17. The locking ring according to claim 16, wherein each of said one or more setscrews includes a foot to mechanically couple with the bearing assembly.

18. The locking ring according to claim 17, wherein said foot of the setscrew includes a portion of a screw thread disposed thereon that matches one of the cutout sections of the screw thread.

19. The locking ring according to claim 18, whereby when each of the portions of the screw thread on each foot of each of the one or more set screws is combined with the screw thread with the one or more cutout sections inscribed on the interior surface of the locking ring a substantially complete screw thread is formed on the interior surface of the locking ring.

20. The locking ring according to claim 17, wherein each of the one or more setscrews includes a head that is mechanically couplable with a set tool.

* * * * *